United States Patent
Shigetomi et al.

(12) 
(10) Patent No.: US 6,287,661 B1
(45) Date of Patent: Sep. 11, 2001

(54) LABEL FOR OPTICAL DISKS AND OPTICAL DISK ADHERED WITH THE LABEL

(75) Inventors: Takashi Shigetomi; Nobuo Ishiwata, both of Kanagawa; Kiyohisa Ashizawa, Saitama; Hiromu Kawaguchi, Tokyo, all of (JP)

(73) Assignees: Lintec Corporation, Tokyo; Optrom Inc., Miyagi, both of (JP)

(*) Notice: Subject to any disclaimer, the term of this patent is extended or adjusted under 35 U.S.C. 154(b) by 0 days.

(21) Appl. No.: 09/168,846

(22) Filed: Oct. 9, 1998

(51) Int. Cl.$^7$ ........................................... B32B 3/00
(52) U.S. Cl. .................. 428/64.7; 369/275.1; 369/283; 369/288; 428/40.1; 428/64.4; 428/65.2; 428/201; 428/202; 428/412
(58) Field of Search ................... 428/40.1, 41.8, 428/42.1, 42.2, 201, 202, 412, 64.1, 64.4, 64.7, 65.2; 369/275.1, 283, 288

(56) References Cited

U.S. PATENT DOCUMENTS

| | | | | |
|---|---|---|---|---|
| 4,772,512 | * | 9/1988 | Nagafuchi | 428/331 |
| 5,552,009 | * | 9/1996 | Zager | 156/220 |
| 5,858,498 | * | 6/1999 | Ohkubo | 428/64.1 |

\* cited by examiner

*Primary Examiner*—Nasser Ahmad
(74) *Attorney, Agent, or Firm*—Sughrue, Mion, Zinn, Macpeak & Seas, PLLC

(57) ABSTRACT

The present invention provides a label for optical disks which comprises a base sheet having a coefficient of linear expansion of $1.0 \times 10^{-5}$ to $12.0 \times 10^{-5}$ and a thermal shrinkage ratio of 3 or below percent, a display formed on at least one surface of the base sheet, and an adhesive layer formed on a surface of the base sheet or the display. The label for optical disks can be applied on the surface of the optical disk with displays such as various printings and phologrmicroms, and can provides an optical disk having beauty and fineness in aesthetic.

2 Claims, No Drawings

LABEL FOR OPTICAL DISKS AND OPTICAL DISK ADHERED WITH THE LABEL

BACKGROUND OF THE INVENTION

1. Field of the Invention

The present invention relates to a label for optical disks and an optical disk adhered with the label.

2. Description of Related Art

In recent years, optical disks such as a compact disk (CD), a laser disk (LD) and a digital video disk (DVD) have prevailed. The optical disks are recorded with various informations such as computer informations, music, image and the like, and the recorded informations are reproduced by a ray irradiate.

The optical disks are structured with an aluminum vapor deposition film formed on a surface of a substrate such as a polycarbonate substrate and a hard coat layer formed on the aluminum vapor deposition film for protecting the aluminum vapor deposition film.

For displaying the recorded informations in the optical disk and et. al., printing has been applied directly on the hard coat layer.

Therefore, there is a problem that if the printing is unsuccessful on the hard coat layer, all of the optical disk must be rejected. Also, there is another problem that the kinds of applicable printings are restricted because of a shape, material characteristic and et. al. of the optical disk, and it is difficult to apply the display on the hard coat layer by high technical printings such as photoengraving process printing and phologram.

SUMMARY OF THE INVENTION

The present invention is provided to resolve the problems described above.

One object of the present invention is to provide a label for optical disks which is not rejected because of printing failure, can be applied on the surface of the optical disk with displays such as various printings and phologrrams, and can provides an optical disk having beauty and fineness in an aesthetic outward appearance.

Extensive investigations undertaken by the present inventors directed to the objects described above have led to an idea of beforehand forming the display on the optical disk with a label having the display by printing, instead of forming the display by printing directly on the hard coat layer of the optical disk. And further detail investigations undertaken by the present inventors directed to the adaptation of the label material to the optical disk have led to the discovery that such objects can be achieved by using a base sheet having a coefficient of linear expansion of $1.0 \times 10^{-5}$ to $12.0 \times 10^{-5}$ and a thermal shrinkage ratio of 3 or below percent as the base sheet of the label.

Thus, the present invention is directed to a label for optical disks which comprises a base sheet having a coefficient of linear expansion of $1.0 \times 10^{-5}$ to $12.0 \times 10^{-5}$ and a thermal shrinkage ratio of 3 or below percent, a display formed on at least one surface of the base sheet, and an adhesive layer formed on the surface of the base sheet or the display. Also, the present invention is directed to an optical disk which is composed of a polycarbonate resin substrate and is adhered with the label for optical disks as described above.

DESCRIPTION OF PREFERRED EMBODIMENTS

The base sheet of the label for optical disks of the present invention has a coefficient of linear expansion of $1.0 \times 10^{-5}$ to $12.0 \times 10^{-5}$, preferably $3.0 \times 10^{-5}$ to $10.0 \times 10^5$, more preferably $5.0 \times 10^{-5}$ to $8.0 \times 10^{-5}$. When the coefficient of linear expansion is less than $1.0 \times 10^{-5}$, the substrate of the optical disk composed of a polycarbonate resin or the like generates warpage after adhering the label for optical disks on the optical disk and the recorded data are reproduced insufficiently or not at all. When the coefficient of linear expansion is more than $12.0 \times 10^{-5}$, the label generates distortion and wrinkle, and is damaged aesthetically after adhering the label for optical disks on the optical disk.

Further, the base sheet of the label for optical disks of the present invention has a thermal shrinkage ratio of 3 or below percent, preferably 2 or below, more preferably 1 or below. The thermal shrinkage ratio needs to be within the range described above in both of machine direction (hereinafter called "MD") and transverse direction (hereinafter called "TD"). When the thermal shrinkage ratio is more than 3 percent, the substrate of the optical disk generates warpage after adhering the label for optical disks on the optical disk and the recorded data are reproduced insufficiently or not at all.

Examples of the base sheet satisfying the above-mentioned condition of the coefficient of linear expansion and the thermal shrinkage ratio are, for example, a polycarbonate resin film, a polyester resin film such as a polyethyleneterephthalate resin, a polybutyleneterephthalate resin and a polyethylenenaphthalate resin (PEN resin), a polyvinylchloride resin film, and a norbornene resin film, preferably a polycarbonate resin film.

The base sheet has preferably a glass transition temperature of not less than 60° C. When the glass transition temperature is less than 60° C., the base sheet are shrunk largely and the substrate of the optical disk easily generates warpage and the label easily generates distortion and wrinkle.

The base sheet is a single-layer structure or multi-layers structure of same or different films.

The base sheet can be oriented in uniaxially or biaxially, or is not oriented.

Further, the base sheet is transparent, translucent or opaque.

The thickness of the base sheet can be selected properly, and is generally in the range of 10 to 200 micrometers, preferably 20 to 150 micrometers.

The display is formed on at least one surface of the base sheet of the label for optical disks of the present invention. The display is formed by printing, phologram treatment or the like. The printing includes various printing technologies such as offset printing, flexographic printing, silk screen printing and gravure printing.

A pattern of the display includes various patterns such as a letter, a symbol, a figure, a picture, a photograph and a combination of two or more members.

Further, the display can be covered with a protect film, a coating agent layer or the like. When the display is covered with a protect film or a coating agent layer, the coefficient of linear expansion and the thermal shrinkage ratio of the covering layer such as the protect film and the coating agent layer are preferably in the range of that of the base sheet of the label for optical disks.

The adhesive layer is formed on at least one surface of the base sheet of the label for optical disks of the present invention. The adhesive layer can be composed of one or more various adhesives. Examples of the adhesives are a pressure sensitive adhesive and a heat sensitive adhesive. Preferable adhesive is the pressure sensitive adhesive.

Examples of the pressure sensitive adhesives are, for example, a natural rubber, a synthetic rubber, an acrylic resin, a polyvinylether resin, an urethane resin and a silicone resin pressure sensitive adhesives. Examples of the synthetic rubber are a styrene-butadiene rubber, a polyisobutylene rubber, an isobutylene-isoprene rubber, an isoprene rubber, a styrene-isoprene block copolymer, a styrene-butadiene block copolymer and a styrene-ethylene-butylene block copolymer. Examples of the acrylic resin are a homopolymer or copolymer of acrylic acid, methyl acrylate, ethyl acrylate, propyl acrylate, butyl acrylate, 2-ethylhexyl acrylate, ethyl methacrylate, butyl methacrylate, acrylonitrile or the like. Examples of the polyvinylether resin are polyvinylether, polyvinyisobutylether, or the like. Examples of the silicone resin are dimethylpolysiloxane or the like.

Examples of the heat sensitive adhesives are, for example, a polyethylene resin, an ethylene-vinylacetate resin, a polyester resin, a polyurethane resin and a synthetic rubber.

The adhesive can be used singly or in combination of two or more members.

The adhesives can contain a tackifier, a filler, a softening agent, a wax, an antioxidant, an ultraviolet absorber or a crosslinking agent as required. The tackifier includes rosin resins, terpene-phenolic resins, terpene resins, aromatic hydrocarbon modified terpene resins, petroleum resins, cumarone-inden resins, styrene resins, phenolic resins and xylene resins. The filler includes zinc oxide, titanium oxide, silica, calcium carbonate and barium sulfate. The softening agent includes process oils, liquid rubbers and plasticizers. The wax includes natural wax, mineral wax, polyethylene wax and paraffin wax. The antioxidant includes anilides, phenols, phosphites and thioesters. The ultraviolet absorber includes benzophenones and bonzotriazole. The crosslinking agent includes epoxides, isocyanates and metal chelates.

The adhesive layer can be provided by various methods, including a method in which an adhesive dissolved in a suitable solvent is applied to the surface of the base film or the display, a method in which an adhesive dispersed or emulsified in a suitable medium is applied to the surface of the base film or the display, a method in which an adhesive is applied by calendar rolls without using solvents, a method in which an adhesive layer formed on a release liner is transferred on the surface of the base film or the display, and a method in which a double-sided adhesive tape applied to both surfaces of a core sheet with the adhesive is overlaid on the surface of the base film or the display.

The thickness of the adhesive layer is not limited to a specific thickness, but is normally in a range between 3 and 100 micrometers, preferably in a range between 5 and 60 micrometers, more preferably in a range between 10 and 40 micrometers.

A release liner can be applied on the surface of the adhesive layer.

The release liner is composed of a support sheet having at least one releasable surface or a support sheet having a release-treated surface with a release agent or by the other method as required.

The support sheet includes papers, synthetic papers and plastic films. The papers include glassine papers and laminated papers. The plastic films include polyolefin resins such as polyethylene resins and polypropylene resins, polyester resins such as polybutyleneterephthalate resins and polyethyleneterephthalate resins, acetate resins, polystyrene resins and vinylchloride resins. The plastic films are not restricted to the above-mentioned plastic films.

A release agent includes silicone resins, alkyd resins, fluorine resins, cellulose resins, melamine resins, acrylic resins, polyurethane resins and polyester resins, preferably silicone resins and alkyd resins.

The release agent can be provided on the support sheet by various methods, including a method in which an release agent is provided on the support sheet by application, transfer, printing or the like, and a method in which a resin film is laminated on the support sheet.

The thickness of the release liner is not limited to a specific thickness, but can be selected properly.

The size of the label for optical disks can be selected properly according to the size of the optical disk.

The label for optical disks of the present invention is particularly effective to a polycarbonate resin substrate of the optical disk.

EXAMPLE

The present invention is described more specifically by reference to embodiments thereof. It should be noted that the present invention is not intended to be limited by these examples.

The coefficient of linear expansion of the base sheet of the label for optical disks was measured according to a test method, which was provided in Japanese Industrial Standard K-7197.

The thermal shrinkage ratio of the base sheet of the label for optical disks was decided by measuring shrinkage ratio of the measurement of the base sheet after standing the base sheet at 80° C. for 48 hours.

Example 1

A transparent and annealing-treated polyethyleneterephthalate resin film having a thickness of 50 micrometers, a coefficient of linear expansion of $1.5 \times 10^{-5}$, a thermal shrinkage ratio of 1 percent in MD and 0 percent in TD and a glass transition temperature of 69° C. was used as the base sheet of the label for the optical disk. A phologram treatment was applied on one surface of the base sheet. An acrylic pressure sensitive adhesive (PK, produced by LINTEC CORPORATION) was applied on the phologram-treated surface of the base sheet in an amount to form a film having dried thickness of 30 micrometers and dried to form an adhesive layer. Further, a release liner having a thickness of 70 micrometers, in which a silicone resin layer is formed on a surface of a polyethylene resin film in a polyethylene laminated paper, was laminated on a surface of the adhesive layer to form a label for optical disks.

Example 2

A label for optical disks was obtained by the same method as in Example 1, except that a transparent PEN resin film having a thickness of 50 micrometers, a coefficient of linear expansion of $1.3 \times 10^{-5}$, a thermal shrinkage ratio of 0 percent in MD and 0 percent in TD and a glass transition temperature of 115° C. was used as the base sheet of the label for the optical disk, and an offset printing was applied on one surface of the base sheet, and the pressure sensitive adhesive was applied on the other surface of the base sheet.

Example 3

A label for optical disks was obtained by the same method as in Example 2, except that a transparent polycarbonate resin film having a thickness of 50 micrometers, a coefficient of linear expansion of $6 \times 10^{-5}$, a thermal shrinkage ratio of 0 percent in MD and 1 percent in TD and a glass transition temperature of 150° C. was used as the base sheet of the label for the optical disk.

Example 4

A label for optical disks was obtained by the same method as in Example 2, except that a transparent polycarbonate resin film having a thickness of 100 micrometers, a coefficient of linear expansion of $7 \times 10^{-5}$, a thermal shrinkage ratio of 0 percent in MD and 0 percent in TD and a glass transition temperature of 150° C. was used as the base sheet of the label for the optical disk.

Comparative Example 1

A label for optical disks was obtained by the same method as in Example 2, except that a transparent polymethylmethacrylate resin film having a thickness of 50 micrometers, a coefficient of linear expansion of $14.0 \times 10^{-5}$, a thermal shrinkage ratio of 1 percent in MD and 4 percent in TD and a glass transition temperature of 90° C. was used as the base sheet of the label for the optical disk.

Application Example

The labels for optical disks obtained in Examples 1 to 4 and Comparative Example 1 were cut in a circle shape having a diameter of 116 millimeters, in which a circle having a diameter of 16 millimeters was cut out at a center part. And the release liners were peeled from the labels for optical disks and the labels were respectively adhered on the surface of hard coats of optical disks. The optical disks were structured with an aluminum vapor deposition film formed on a surface of a circular polycarbonate substrate plate, having a thickness of 1.2 millimeters and a diameter of 120 millimeters and were cut out in a circle having a diameter of 15 millimeters at a center part.

Distortions and warpages of optical disks before being adhered with the labels for optical disks, optical disks after being adhered with the labels for optical disks, and optical disks which were exposed under an environment of 70° C. and 90 percent RH for 72 hours after adhering the labels for optical disks and stood at room temperature for 24 hours, were measured by using a test machine for measuring mechanical characteristic (model: ODC-02, produced by SHINDENSHI CO. LTD.). The results are shown in Table 1

TABLE 1

| | after environment test | |
|---|---|---|
| | distortion MAX ± 400 μm | warpage ± 1.6° |
| Example 1 | −280.142 | −0.720 |
| Example 2 | −278.646 | −0.549 |
| Example 3 | −133.509 | 0.137 |
| Example 4 | −120.043 | 0.160 |
| Comparative Example 1 | 171.23 | 1.701 |

The label for optical disks of the present invention which is not rejected because of printing failure, can be easily applied on the surface of the optical disk with displays such as various printings and phologrames.

The entire disclosure of Japanese Patent Application No. Hei 9-108356, filed on Apr. 11, 1997, including the specification, claims and summary is incorporated herein by reference in its entirety.

The invention has been described in detail with particular reference to preferred embodiments thereof, but it is understood that variations and modifications can be effected within the spirit and scope of the invention.

What is claimed is:

1. An optical disk having a label adhered thereto wherein said optical disk includes a polycarbonate resin substrate, a vapor deposition film formed over the substrate and a hard coat layer formed over said vapor deposition film, and wherein said label is adhered to said hard coat layer and is comprised of a base sheet having a coefficient of linear expansion of $1.0 \times 10^{-5}$ to $12.0 \times 10^{-5}$ and a thermal shrinkage ratio of 3% or below and a display formed on at least one surface of the base sheet.

2. An optical disk as set forth in claim 1, wherein the base sheet of the label has a glass transition temperature of not less than 60° C.

* * * * *